United States Patent
Luo et al.

(10) Patent No.: US 11,370,250 B2
(45) Date of Patent: Jun. 28, 2022

(54) NON-PNEUMATIC TIRE, CAR WHEEL DEVICE, TIRE MEMBER, AND SECURING FASTENER

(71) Applicant: ZHONGCE RUBBER GROUP CO., LTD, Zhejiang (CN)

(72) Inventors: Nailiang Luo, Zhejiang (CN); Jirong Wang, Zhejiang (CN)

(73) Assignee: ZHONGCE RUBBER GROUP CO., LTD, Zhejiang (CN)

( * ) Notice: Subject to any disclaimer, the term of this patent is extended or adjusted under 35 U.S.C. 154(b) by 118 days.

(21) Appl. No.: 16/755,159

(22) PCT Filed: Sep. 26, 2018

(86) PCT No.: PCT/CN2018/107504
§ 371 (c)(1),
(2) Date: Apr. 10, 2020

(87) PCT Pub. No.: WO2019/076184
PCT Pub. Date: Apr. 25, 2019

(65) Prior Publication Data
US 2020/0298622 A1    Sep. 24, 2020

(30) Foreign Application Priority Data
Oct. 16, 2017    (CN) .......................... 201710962396.1

(51) Int. Cl.
*B60C 7/24*    (2006.01)
*B60C 7/10*    (2006.01)
*B60C 7/12*    (2006.01)

(52) U.S. Cl.
CPC ................ *B60C 7/24* (2013.01); *B60C 7/107* (2021.08); *B60C 7/12* (2013.01); *B60C 7/10* (2013.01)

(58) Field of Classification Search
CPC .... B60C 7/24; B60C 7/26; B60C 7/28; B60C 7/107; B60C 7/12; B60C 2007/107
See application file for complete search history.

(56) References Cited

U.S. PATENT DOCUMENTS 700,837 A * 5/1902 Seiberling ................. B60C 7/24
                                                       152/382
954,224 A * 4/1910 Swinehart ................. B60C 7/24
                                                       152/382

(Continued)

FOREIGN PATENT DOCUMENTS

CN    2570068    9/2003
CN    2631795    8/2004

(Continued)

OTHER PUBLICATIONS

"International Search Report (Form PCT/ISA/210) of PCT/CN2018/107504," dated Dec. 20, 2018, with English translation thereof, pp. 1-4.

*Primary Examiner* — Kip T Kotter
(74) *Attorney, Agent, or Firm* — JCIP Global Inc.

(57) ABSTRACT

A tire member of a non-pneumatic tire is provided. An inner circumference of the tire member is provided with a mounting protrusion. Securing notches for securing the tire member to a rim are provided at two sides of where the mounting protrusion joins the tire member. A position fixing groove is provided at an inner circumference of the mounting protrusion. The position fixing groove has an annular structure; alternatively, the position fixing groove has an arc structure, and a plurality of the position fixing grooves having the arc structure are uniformly distributed at the inner circumference of the mounting protrusion in a circumferential direction. Two side walls of the position fixing groove are provided with several securing holes below the securing notches, respectively. The securing holes pass through the (Continued)

side walls of the position fixing groove, and partially coincide with securing notches at an outer side.

4 Claims, 5 Drawing Sheets

(56) References Cited

U.S. PATENT DOCUMENTS

| | | | | |
|---|---|---|---|---|
| 1,198,240 A * | 9/1916 | Krotz | ........................ | B60C 7/24 |
| | | | | 152/382 |
| 2006/0096685 A1* | 5/2006 | Fukui | ........................ | B60C 7/26 |
| | | | | 152/387 |
| 2012/0285595 A1* | 11/2012 | Su | ............................ | B60C 7/26 |
| | | | | 152/310 |

FOREIGN PATENT DOCUMENTS

| | | | | |
|---|---|---|---|---|
| CN | 103754069 | | 4/2014 | |
| CN | 107020887 | | 8/2017 | |
| CN | 107627789 | | 1/2018 | |
| EP | 1655150 A1 * | | 5/2006 | ............... B60C 7/26 |
| EP | 2789477 | | 10/2014 | |
| FR | 482615 A * | | 4/1917 | ............... B60C 7/24 |

* cited by examiner

NON-PNEUMATIC TIRE, CAR WHEEL DEVICE, TIRE MEMBER, AND SECURING FASTENER

CROSS-REFERENCE TO RELATED APPLICATION

This application is a 371 of international application of PCT application serial no. PCT/CN2018/107504, filed on Sep. 26, 2018, which claims the priority benefit of China application no. 201710962396.1, filed on Oct. 16, 2017. The entirety of each of the above mentioned patent applications is hereby incorporated by reference herein and made a part of this specification.

BACKGROUND

Technical Field

The invention relates to a non-pneumatic tire.

Description of Related Art

First, refer to FIG. 1, FIG. 1 is a schematic diagram of a conventional non-pneumatic tire combined with a rim, wherein the bottom of the non-pneumatic tire 1a is provided with a mounting protrusion 2a, and several high-strength fiber bundles or a plurality of steel wires of the mounting protrusion 2a are used to fix the non-pneumatic tire 1 inside the rim 3a.

Due to the fact that the high-strength fiber bundles or the plurality of steel wires have poor stretching performance, the configuration of the non-pneumatic tire 1a is difficult. If the fiber bundle is not adopted, it will also cause the risk of tripping of the non-pneumatic tire 1a during use. Besides, the solution does not solve the problem of relative sliding movement between the tire and the rim 3a.

SUMMARY

Technical Problem

The technical problem to be solved by the present invention is to overcome the shortcomings of related art. The first purpose of the present invention provides a tire member of a non-pneumatic tire. The second purpose of the present invention is to provide a securing fastener. The third purpose of the present invention is to provide a non-pneumatic tire using the above-mentioned tire member and the securing fastener. The fourth purpose of the present invention is to provide a wheel device employing the aforementioned non-pneumatic tire. The tire member of the present invention can be matched with the securing fastener so that the non-pneumatic tire can be reliably fixed in the rim, and the relative sliding movement between the tire and the rim can be reduced while detachment can be avoided, so that the trouble of daily maintenance of tire can be saved.

Technical Solution

In order to achieve the above-mentioned first purpose, the present invention adopts the following technical solutions:

A tire member of a non-pneumatic tire is provided. An inner circumference of the tire member is provided with a mounting protrusion. Securing notches for securing the tire member to a rim are provided at two sides of where the mounting protrusion joins the tire member. A position fixing groove is provided at an inner circumference of the mounting protrusion. The position fixing groove has an annular structure; alternatively, the position fixing groove has an arc structure, and a plurality of the position fixing grooves having the arc structure are uniformly distributed at the inner circumference of the mounting protrusion in a circumferential direction.

Two side walls of the position fixing groove are provided with several securing holes below the securing notches, respectively. The securing holes pass through the side walls of the position fixing groove.

As a further improvement, the fixing notch is an annular fixing groove in the circumferential direction; alternatively, the fixing notch is formed of plurality of arc-shaped fixing groove arranged in the circumferential direction; yet alternatively, the fixing notch is formed of a plurality of fixing holes arranged in the circumferential direction.

As a further improvement, the position fixing groove is an arc structure, and 4 to 100 pieces of position fixing grooves are uniformly arranged on the inner ring of the mounting protrusion in the circumferential direction.

As a further improvement, the depth of the position fixing groove is 5-30 mm; the length of the fixing hole is from 1 to 30 mm.

As a further improvement, the tire member is a solid tire member; alternatively, the tire member is provided with cavities in the inner circumferential direction, and the number of cavities is 1 to 10. Alternatively, a plurality of holes are arranged in the axial direction of the tire member, and the plurality of holes are arranged uniformly along the circumferential direction of the tire member. The depth of the holes is 5 mm or more, or the through holes are provided, and the number of holes is from 12 to 100.

In order to achieve the above second purpose, the present invention adopts the following technical solutions:

A securing fastener suitable for the tire member is provided. The securing fastener is an annular structure or an arc structure, and a plurality of arc-structured securing fasteners form an intermittent ring. The outer ring of the securing fastener has a support portion and a position fixing portion. The inner ring of the securing fastener is a protruding blocking portion. The outer ring of the support portion is adapted to the position fixing groove. The two position fixing portions are respectively located on both sides of the support portion. The position fixing portion is adapted to the fixing hole. The inner ring of the blocking portion is adapted to the position fixing block or protruded spoke head on the inner side of the rim.

As a further improvement, the cross section of the securing fastener is U-shaped, and there are two support portions. The two support portions are respectively disposed on two upper ends of the U-shaped securing fastener, and the position fixing portions are respectively located on both sides of the support portion. The blocking portion is provided at the bottom of the U-shaped securing fastener; alternatively, the cross section of the securing fastener is W-shaped, and there are two support portions. The two support portions are respectively provided at two upper ends of the W-shaped securing fastener. The position fixing portions are respectively located on both sides of the support portion, and the blocking portion is provided at the bottom of the W-shaped securing fastener. Alternatively, the cross section of the securing fastener is W-shaped, and there are three support portions. The three support portions are respectively provided at two upper ends and middle upper ends of the W-shaped securing fastener, and the position fixing portions are respectively located on both sides of the support portions of the two upper ends. The blocking portion is provided at the bottom of the W-shaped securing fastener. Alternatively, the cross-section of the securing fastener is V-shaped, and there are two support portions. The two support portions are respectively disposed on the two upper ends of the V-shaped securing fastener, and the position fixing portions are respectively located on both sides of the support portion. The blocking portion is provided at the bottom of the V-shaped securing fastener.

As a further improvement, the blocking portion is configured in a continuous or intermittent manner, the height thereof is from 1 to 30 mm, and the thickness of the intermittent blocking portion is from 1 to 10 mm.

In order to achieve the third purpose, the present invention adopts the following technical solutions:

A non-pneumatic tire is provided, including a tire member and a securing fastener, wherein the tire member is the tire member described in any one of the above technical solutions, and the securing fastener is the securing fastener described in any one of the above technical solutions. The securing fastener is installed in the position fixing groove, the outer ring of the support portion abuts against the inner wall of the position fixing groove, and the position fixing portion passes through the fixing hole.

In order to achieve the fourth purpose, the present invention adopts the following technical solutions:

A non-pneumatic tire wheel device is provided. The wheel device includes a rim and a non-pneumatic tire. The non-pneumatic tire is the non-pneumatic tire described in the third purpose. The edge of the rim is secured on the fixing notch, and the position fixing portion passes through the outer portion of the fixing hole to be engaged with the edge of the rim. The inner ring of the blocking portion is engaged with the position fixing block or protruded spoke head at the inner side of the rim.

Advantageous Effect

Since the present invention adopts the above technical solution, the non-pneumatic tire of the present invention can utilize the special shape of the securing fastener, so that the non-pneumatic tire can be reliably fitted in the rim, thus reducing relative sliding movement between the tire and the rim.

DESCRIPTION OF THE PREFERRED EMBODIMENTS

Preferred Embodiment of the Invention

The present invention will be further described in detail below with reference to the accompanying drawings and specific embodiments.

Figure 1:
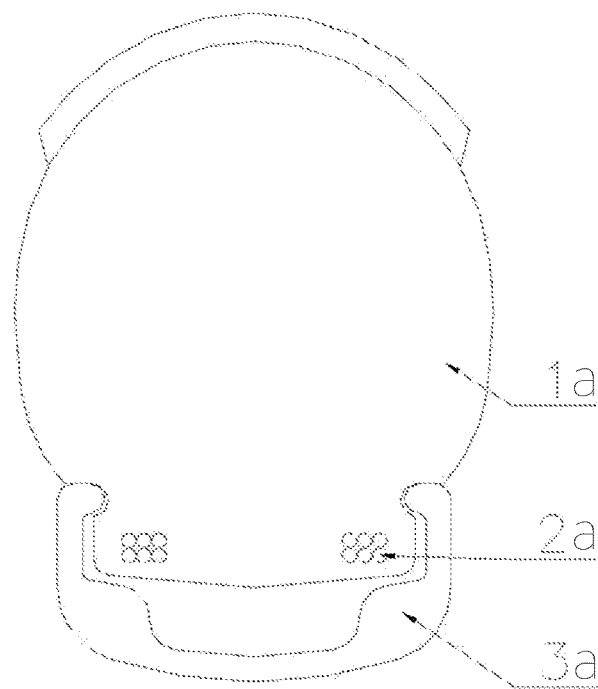
FIG. 1 is a schematic diagram of a conventional non-pneumatic tire combined with a rim.
Figure 2:
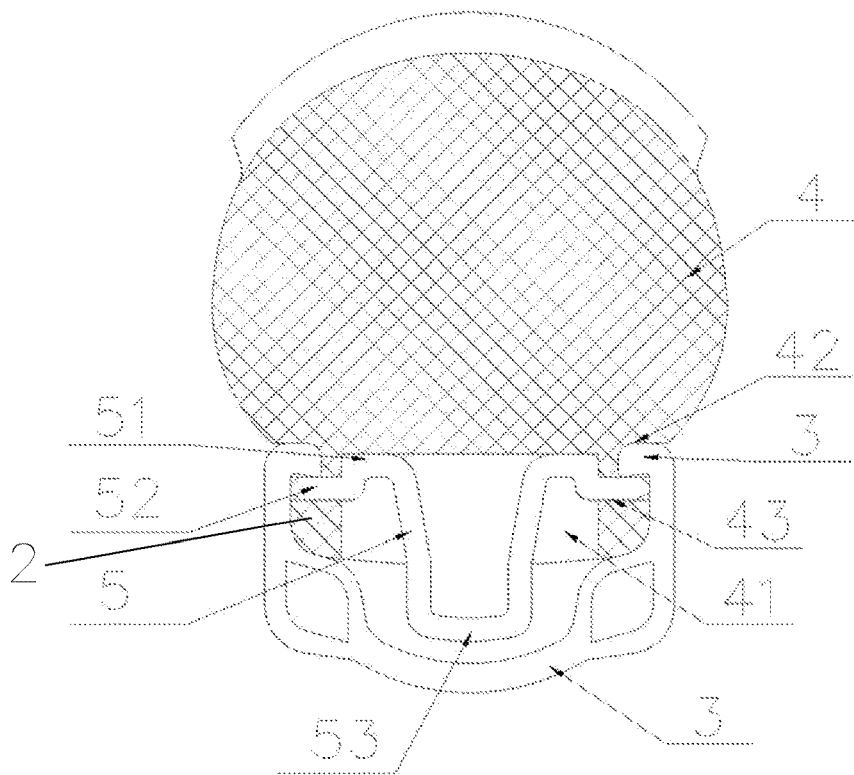
FIG. 2 is a schematic diagram of a non-pneumatic tire of the present invention combined with a rim.
Figure 4:
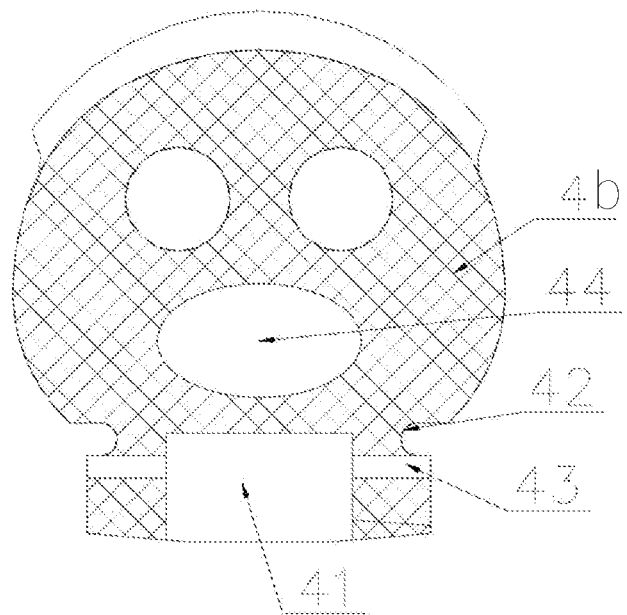
FIG. 4 is a schematic cross-sectional view of another tire of the present invention.
Figure 5:
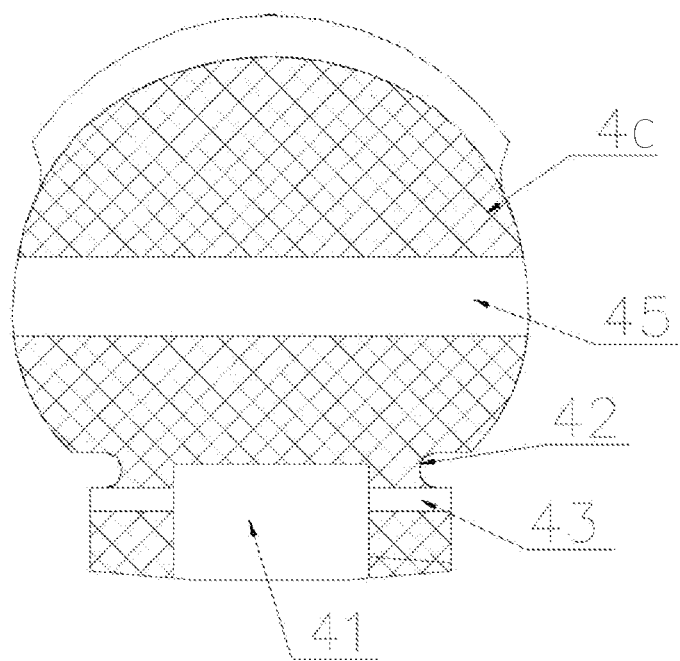
FIG. 5 is a schematic cross-sectional view of still another tire according to the present invention.

A non-pneumatic tire wheel device as shown in FIG. 2 is provided, the wheel device includes a rim 3 and a non-pneumatic tire 1. The non-pneumatic tire 1 includes a tire member 4 and a securing fastener 5, and the tire member 4 may be a solid tire member 4; alternatively, as shown in FIG. 4, a cavity 44 is provided in the inner circumferential direction of the tire member 4b. The number of the cavity 44 is 1 to 10; alternatively, as shown in FIG. 5, the tire member 4c is provided with a plurality of holes 45 in the axial direction, the plurality of holes 45 are uniformly arranged in the circumferential direction of the tire member 4, and the depth of the holes 45 is 5 mm or more or through holes are provided. The number of the holes 45 is between 12 and 100. As shown in FIG. 2, the inner ring of the tire member 4 is provided with a mounting protrusion 2, the mounting protrusion 2 is embedded in the rim 3, and fixing notches 42 are provided at two sides of where the mounting protrusion 2 joins the tire member 4. The fixing notch 42 is an annular circumferential fixing groove, and the edge of the rim 3 is fitted to the fixing notch 42.

Figure 3:
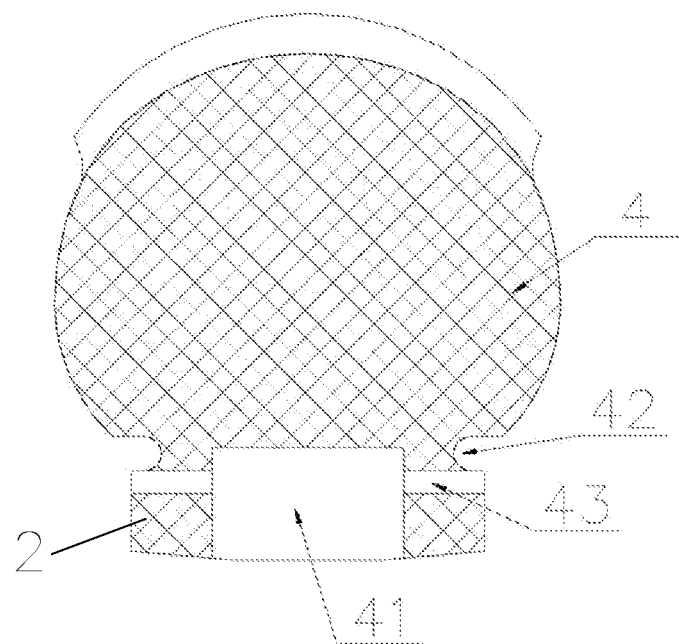
FIG. 3 is a schematic cross-sectional view of another tire of the present invention.
Figure 6:
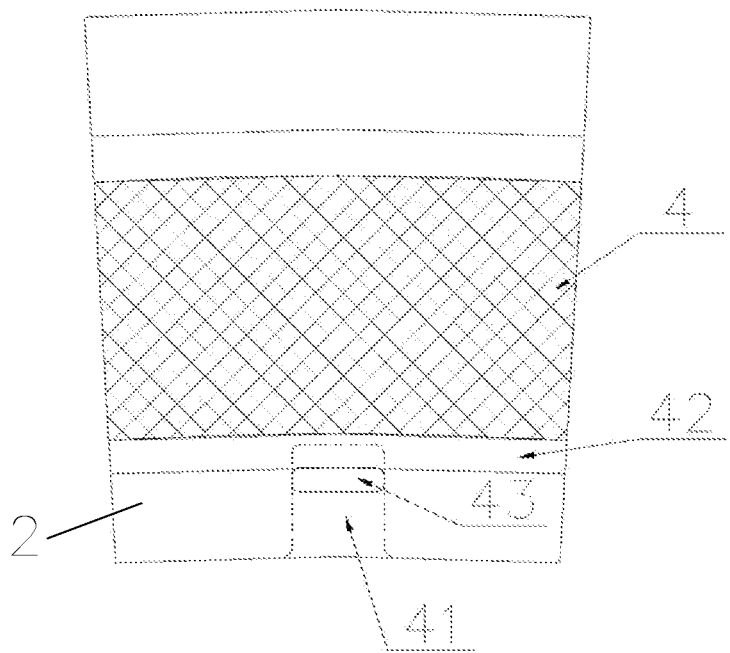
FIG. 6 shows a side view of a non-pneumatic tire.

As shown in FIG. 3 and FIG. 6, the inner ring of the mounting protrusion 2 is provided with a position fixing groove 41. The position fixing groove 41 is an arc structure. The depth of the position fixing groove 41 is 5 to 30 mm; 4 to 100 pieces of arc-structured position fixing grooves 41 are uniformly arranged on the inner ring of the mounting protrusion 2 in the circumferential direction. A plurality of fixing holes 43 are respectively provided below the fixing notch 42 on the two side walls of the position fixing groove 41. The fixing holes 43 penetrate the side walls of the position fixing groove 41, and the length of the fixing hole 43 is between 1 and 30 mm; and the outer side of the fixing hole 43 partially coincides with the fixing notch 42.

As shown in FIG. 2, the securing fastener 5 is an arc structure, and 4 to 100 pieces of arc-shaped securing fasteners 5 form an intermittent ring; the securing fastener 5 is disposed in the position fixing groove 41. The outer ring of the securing fastener 5 has a support portion 51 and a position fixing portion 52. The inner ring of the securing fastener 5 is a protruding blocking portion 53. The outer ring of the support portion 51 is adapted to the position fixing groove 41. The two position fixing portions 52 are respectively located on both sides of the support portion 51, and the position fixing portions 52 are adapted to the fixing holes 43. The position fixing portions 52 pass through the outer portion of the fixing holes 43 and are engaged with the edge of the rim 3. The securing fastener 5 is made of a material with a certain rigidity, and can be fitted to the edge protrusion of the rim through the fixing holes of the tire so that the non-pneumatic tire 1 can be fitted to the inner portion of the rim 3. The inner ring of the blocking portion 53 is engaged with a position fixing block or a protruded spoke head inside the rim 3, so that the tire and the rim 3 can be positioned circumferentially.

Figure 7:
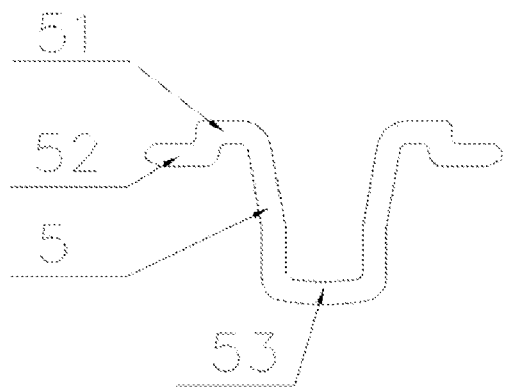
FIG. 7 is a schematic diagram of a securing fastener according to the present invention.
Figure 8:
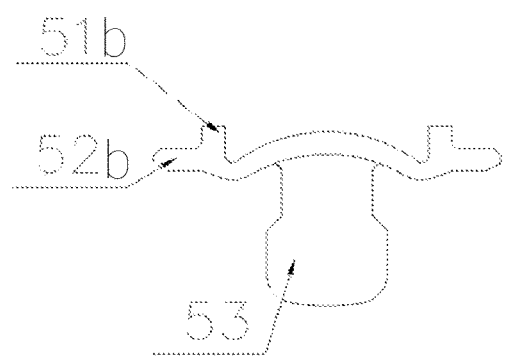
FIG. 8 is a schematic diagram of another securing fastener according to the present invention.
Figure 9:
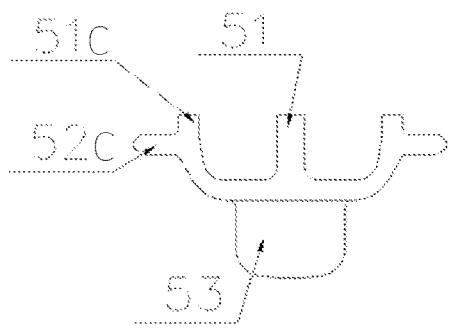
FIG. 9 is a schematic diagram of yet another securing fastener according to the present invention.
Figure 10:
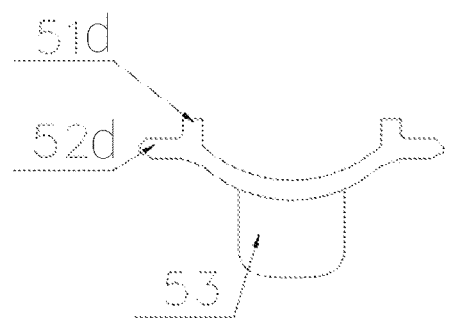
FIG. 10 is a schematic diagram of still another securing fastener according to the present invention.
Figure 11:
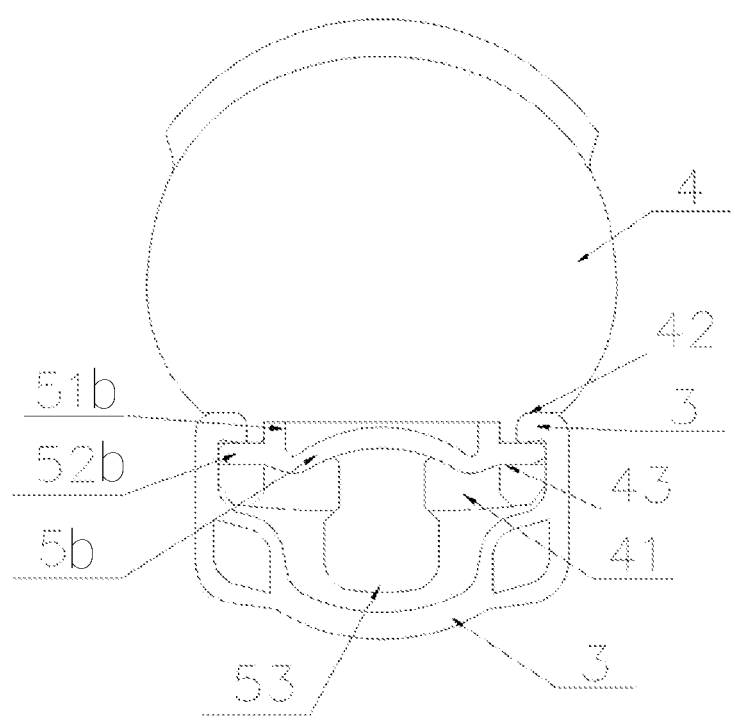
FIG. 11 is a schematic diagram of a non-pneumatic tire combined with a rim adopting the securing fastener shown in FIG. 8.

As shown in FIG. 7, the cross section of the securing fastener 5 is U-shaped, and there are two support portions 51. The two support portions 51 are respectively disposed on two upper ends of the U-shaped securing fastener, and the position fixing portions 52 are respectively located on both sides of the support portion. The blocking portion 53 is provided at the bottom of the U-shaped securing fastener; alternatively, as shown in FIG. 8, the cross section of the securing fastener is W-shaped, and there are two support portions 51b. The two support portions 51b are respectively provided at two upper ends of the W-shaped securing fastener. The position fixing portions 52b are respectively located on both sides of the support portion 51b, and the blocking portion 53 is a stopper. The stopper is provided at the bottom of the W-shaped securing fastener. Alternatively, as shown in FIG. 9, the cross section of the securing fastener is W-shaped, and there are three support portions 51c. The three support portions are respectively provided at two upper ends and middle upper ends of the W-shaped securing fastener, and the position fixing portions 52c are respectively located on both sides of the support portions 51c of the two upper ends. The blocking portion 53 is a stopper, and the stopper is provided at the bottom of the W-shaped securing fastener. Alternatively, as shown in FIG. 10, the cross-section of the securing fastener is V-shaped, and there are two support portions 51d. The two support portions 51d are respectively disposed on the two upper ends of the V-shaped securing fastener, and the position fixing portions 52d are respectively located on both sides of the support portion 51d. The blocking portion 53 is a stopper, and the stopper is provided at the bottom of the V-shaped securing fastener. The blocking portion 53 is configured in a continuous or intermittent manner, and the height thereof is between 1 and 30 mm, and the thickness of the intermittent blocking portion 53 is between 1 and 10 mm.

What is claimed is:

1. A securing fastener adapted to connect a tire member, the tire member comprising a mounting protrusion and fixing notches, wherein the fixing notches for fixing the tire member on a rim are respectively provided at two sides of where the mounting protrusion joins the tire member, wherein the mounting protrusion is provided with a position fixing groove, the position fixing groove is an arc-shaped structure, a plurality of arc-shaped structure position fixing grooves is arranged uniformly in the mounting protrusion; a plurality of fixing holes is respectively disposed below the fixing notches on two side walls of the position fixing groove, the fixing holes pass through the side walls of the position fixing groove, and an outer side of the fixing holes partially coincides with the fixing notches, wherein the securing fastener is an arc structure, and a plurality of the arc-shaped structure securing fasteners forms an intermittent ring; an edge of the securing fastener has a support portion and two position fixing portions, an inner ring of the securing fastener is a protruding blocking portion, an edge of the support portion is adapted to connect the position fixing groove, the two position fixing portions are respectively located on both sides of the support portion, the two position fixing portions are adapted to connect the fixing holes of the tire member, wherein the support portion and the two position fixing portions are an integral structure, wherein the cross section of the securing fastener is U-shaped, and there are two support portions, the two support portions are respectively disposed on two upper ends of the U-shaped securing fastener, and the two position fixing portions are respectively located on both sides of the support portion, the blocking portion is provided at the bottom of the U-shaped securing fastener; alternatively, the cross section of the securing fastener is W-shaped, and there are two support portions, the two support portions are respectively provided at two upper ends of the W-shaped securing fastener, the two position fixing portions are respectively located on both sides of the support portion, and the blocking portion is a stopper provided at the bottom of the W-shaped securing fastener; alternatively, the cross section of the securing fastener is W-shaped, and there are three support portions, the three support portions are respectively provided at upper ends of the W-shaped securing fastener, and the two position fixing portions are respectively located on both sides of the support portions of the two upper ends, the blocking portion is a stopper provided at the bottom of the W-shaped securing fastener; alternatively, the cross-section of the securing fastener is V-shaped, and there are two support portions, the two support portions are respectively disposed on the two upper ends of the V-shaped securing fastener, and the two position fixing portions are respectively located on both sides of the support portion, the blocking portion is a stopper provided at the bottom of the V-shaped securing fastener.

2. The securing fastener according to claim 1, wherein the blocking portion is configured in an intermittent manner, the height thereof is from 1 to 30 mm, and the thickness of the intermittent blocking portion is from 1 to 10 mm.

3. A non-pneumatic tire comprising a tire member and a securing fastener, wherein the tire member comprises a mounting protrusion and fixing notches, wherein the fixing notches for fixing the tire member on a rim are respectively provided at two sides of where the mounting protrusion joins the tire member, wherein the mounting protrusion provided with a position fixing groove, the position fixing groove is an arc-shaped structure, a plurality of arc-shaped structure position fixing grooves is arranged uniformly in the mounting protrusion; a plurality of fixing holes is respectively disposed below the fixing notches on two side walls of the position fixing groove, the fixing holes pass through the side walls of the position fixing groove, and an outer side of the fixing holes partially coincides with the fixing notches;

wherein the securing fastener is an arc structure, and a plurality of arc-shaped structure securing fasteners forms an intermittent ring; an edge of the securing fastener has a support portion and two position fixing portions, an inner ring of the securing fastener is a protruding blocking portion, an edge of the support portion is adapted to connect the position fixing groove, the two position fixing portions are respectively located on both sides of the support portion, the two position fixing portions are adapted to connect the fixing holes of the tire member, wherein the support portion and the two position fixing portions are an integral structure, wherein the securing fastener is disposed in a position fixing groove, an edge of the support portion abuts against an inner wall of the position fixing groove, and the two position fixing portions respectively pass through and are disposed in the fixing holes.

4. A wheel device having a non-pneumatic tire, the wheel device comprising the rim and the non-pneumatic tire according to claim 3, wherein an edge of the rim is fitted to the fixing notches, and each of the two position fixing portions passes through an outer portion of the corresponding fixing holes and is engaged with the edge of the rim.

\* \* \* \* \*